(12) United States Patent
Greenberg-Barak et al.

(10) Patent No.: US 9,553,863 B2
(45) Date of Patent: Jan. 24, 2017

(54) COMPUTER IMPLEMENTED METHOD AND SYSTEM FOR AN ANONYMOUS COMMUNICATION AND COMPUTER PROGRAM THEREOF

(71) Applicant: TELEFONICA DIGITAL ESPANA, S.L.U., Madrid (ES)

(72) Inventors: Merav Greenberg-Barak, Madrid (ES); John Eugene Neystadt, Kfar-Saba (IL)

(73) Assignee: TELEFONICA DIGITAL ESPANA, S.L.U., Madrid (ES)

( * ) Notice: Subject to any disclaimer, the term of this patent is extended or adjusted under 35 U.S.C. 154(b) by 0 days.

(21) Appl. No.: 14/572,026

(22) Filed: Dec. 16, 2014

(65) Prior Publication Data
US 2015/0172270 A1   Jun. 18, 2015

(30) Foreign Application Priority Data
Dec. 17, 2013   (EP) .................................... 13382519

(51) Int. Cl.
| | |
|---|---|
| *G06F 15/16* | (2006.01) |
| *H04L 29/06* | (2006.01) |
| *G06F 17/22* | (2006.01) |
| *H04L 29/08* | (2006.01) |
| *H04L 9/32* | (2006.01) |

(52) U.S. Cl.
CPC ........... *H04L 63/08* (2013.01); *G06F 17/2235* (2013.01); *H04L 63/0407* (2013.01); *H04L 63/0807* (2013.01); *H04L 65/1069* (2013.01); *H04L 67/02* (2013.01)

(58) Field of Classification Search
CPC ...... H04L 63/08; H04L 63/0407; H04L 63/02; G06F 17/2235

USPC ......... 713/168–174, 182–186, 202; 709/206, 709/225, 229, 249, 389; 726/2–8
See application file for complete search history.

(56) References Cited

U.S. PATENT DOCUMENTS

| | | | |
|---|---|---|---|
| 6,526,131 B1 | 2/2003 | Zimmerman et al. | |
| 2008/0201472 A1* | 8/2008 | Bistriceanu ............ | G06Q 30/02 709/225 |
| 2013/0318585 A1* | 11/2013 | Hosoda ................. | G06F 21/335 726/7 |

FOREIGN PATENT DOCUMENTS

| | | |
|---|---|---|
| EP | 2 639 999 A1 | 9/2013 |
| WO | 2006/065789 A2 | 6/2006 |

OTHER PUBLICATIONS

E. Rescorla et al., "WebRTC Security Architecture; draft-i etf-rtcweb-securi ty-arch-07.txt", Internet Engineering Task Force, Internet Society (ISOC) 4, Jul. 14, 2013, pp. 1-43.

(Continued)

Primary Examiner — Evans Desrosiers
(74) Attorney, Agent, or Firm — Sughrue Mion, PLLC

(57) ABSTRACT

A communication service accessible on a web that authenticates user credential information of a first user to authorize a request in order to perform a communication with at least a second user; the first user requesting to the communication service to generate a hyperlink that is associated to its address and provides the generated hyperlink to at least a second user; the latter requesting to initiate said requested communication with said first user by directly clicking on said provided hyperlink, wherein the identity of said at least second user is maintained anonymous and the identity of said first user is done based on the information provided on said hyperlink; said communication between said at least second user and said first user being authorized by and a first server.

12 Claims, 2 Drawing Sheets

(56) References Cited

OTHER PUBLICATIONS

European Search Report for EP 13 38 2519 dated Jul. 3, 2014.

* cited by examiner

COMPUTER IMPLEMENTED METHOD AND SYSTEM FOR AN ANONYMOUS COMMUNICATION AND COMPUTER PROGRAM THEREOF

FIELD OF THE INVENTION

The present invention is generally related within the field of network communications systems and methods, and more particularly it refers to a computer implemented method, to a system and to a computer program thereof for an anonymous communication, i.e. through WebRTC, VoIP, or any other open system.

BACKGROUND OF THE INVENTION

Web based telephony (WebRTC) is a technology that allows sharing real-time data, audio and video, between browsers. As a set of standards, WebRTC provides to any browser capacity share application data and conducts teleconferences, without the need to install plug-ins or third-parties' Software.

WebRTC components are used through advanced programming interfaces in JavaScript (APIs). Currently, said APIs being streamed through the network, which represents the audio and video data flows, and the API Peer Connection, which allows two or more users performing a browser to browser connection. API Data Channel is also in development, which allows the transmission of other types of data for games in real time, instant messaging, file transfer, and others.

Currently, some application areas in which WebRTC is important is in the creation of toll free numbers (e.g. 1-800- in US), a special telephone number which is free for the calling user, instead the telephone carrier charges the called user for the cost of the call, or in anonymous calling through the web.

In addition, it is also important in the case that a business or a user want to provide a service to other people by allowing the latter to call said business or user just by clicking an hyperlink or button (e.g., from the business web page). However, there is currently no technical solution in WebRTC services (or in Voice over IP (VoIP) services) that allows receiving said call after an authorization for said call has been performed maintaining identity of the called user anonymous.

SUMMARY OF THE INVENTION

Therefore, an object of the present invention is to provide a mechanism that allows a user or a business to receive an authorized communication such as an audio call, a video call, a message, etc. from at least another user, which is kept anonymous, that is, no information regarding said another user has to be provided, hence protecting said user or business from mal-behavior, like spam communications and harassments.

To that end, according to a first aspect there is provided a computer implemented method for an anonymous communication, including WebRTC, VoIP, or others, wherein a communication such as an audio call, a video call, a text message, a multimedia message, or an email is provided between a first user having a computing device and at least a second user having a computing device by means of using at least a communication service accessible on a web. On contrary to the known proposals the method of the first aspect comprises:

authenticating, said communication service, upon a request made by said first user to be logged into said communication service, user credential information of said first user to authorize said request;

requesting, said first user, to said communication service to generate a hyperlink (i.e. an URL, Uniform Resource Locator) that is associated to the communication address of said first user;

providing, said first user, said generated hyperlink to at least a second user;

requesting, said at least second user, to initiate a communication with said first user by directly clicking on said provided hyperlink, wherein the identity of said at least second user is maintained anonymous and the identity of said first user is done based on the information provided on said hyperlink; and authorizing, by a first server in communication with said communication service, said communication between said at least second user and said first user.

By maintaining anonymous the identity of the second user it has to be understood that the second user doesn't need to provide any identification or credential such as its telephone number, IP address, etc. in order to initiate the communication with the first user.

The requesting to generate a hyperlink includes indicating if that said hyperlink to be generated is private or public.

According to an embodiment, if the hyperlink has been indicated as being private, this hyperlink will enclose usage restriction conditions. In this case the providing step will be performed by directly sending said hyperlink via a communication channel such as an email, a text message, a multimedia message or an instant message, by the first user to said second user. In addition, the communication service will use the first server to generate a token, which will be included in the hyperlink to be generated. In accordance with said embodiment, previous to said authorizing step, the token is validated by the first server; said validation process checking said hyperlink usage restriction conditions.

According to an embodiment, if the hyperlink has been indicated as being public, this hyperlink will be published in a web page, tweet, bulk email, etc. In this case and previous said authorizing step being performed, the communication service will require to a second server the generation of an human control and authorization mechanism such as a Captcha mechanism, or any other. Then, the communication service will send a challenge for the human control and authorization mechanism to the second user and after the latter solving said challenge, the communication service will use the first server to generate a second URL including a token which will enclose usage restriction conditions. At that point, the communication service, will redirect the at least second user's browser to said generated second URL, by means of an HTTP redirection, and both will further negotiate a session for the communication. Finally, the first server, will validate the token by checking that said hyperlink conforms with usage restriction conditions.

By means of Captcha it has to be understood a type of challenge-response test used in computing to determine whether or not the user is human.

The usage restriction conditions preferable limit the number of communication attempts in which the hyperlink is effective and/or the period of time in which the hyperlink remains valid.

According to a second aspect there is provided a communication system, comprising at least a communication service installed on a web to provide a communication between a first user having a computing device and at least a second user having a computing device. On contrary to the known proposal, the communication service at least includes: means for authenticating user credential information of said first user; means for generating an hyperlink associated to the communication address of said first user; and means for communicating with a first server, and said first server at least includes means for authorizing said communication between said at least second user and said first user upon the first user having provided said generated hyperlink to said second user and the latter having requested the initiation of said communication by directly clicking on said provided hyperlink.

According to an embodiment, the system further includes a second server configured to generate a human control and authorization mechanism.

Said means for authorizing the communication, in an embodiment, includes means for validating a token by checking usage restriction conditions of said hyperlink.

The system of the second aspect is adapted to implement the method of the first aspect.

The subject matter described herein can be implemented in software in combination with hardware and/or firmware, or a suitable combination of them. For example, the subject matter described herein can be implemented in software executed by a processor.

According to a third aspect there is provided a computer program comprising computer program code means adapted to perform the steps according to the method of claim 1 when said program is run on a computer, a digital signal processor, a field-programmable gate array, an application-specific integrated circuit, a micro-processor, a micro-controller, or any other form of programmable hardware.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

Figure 1:
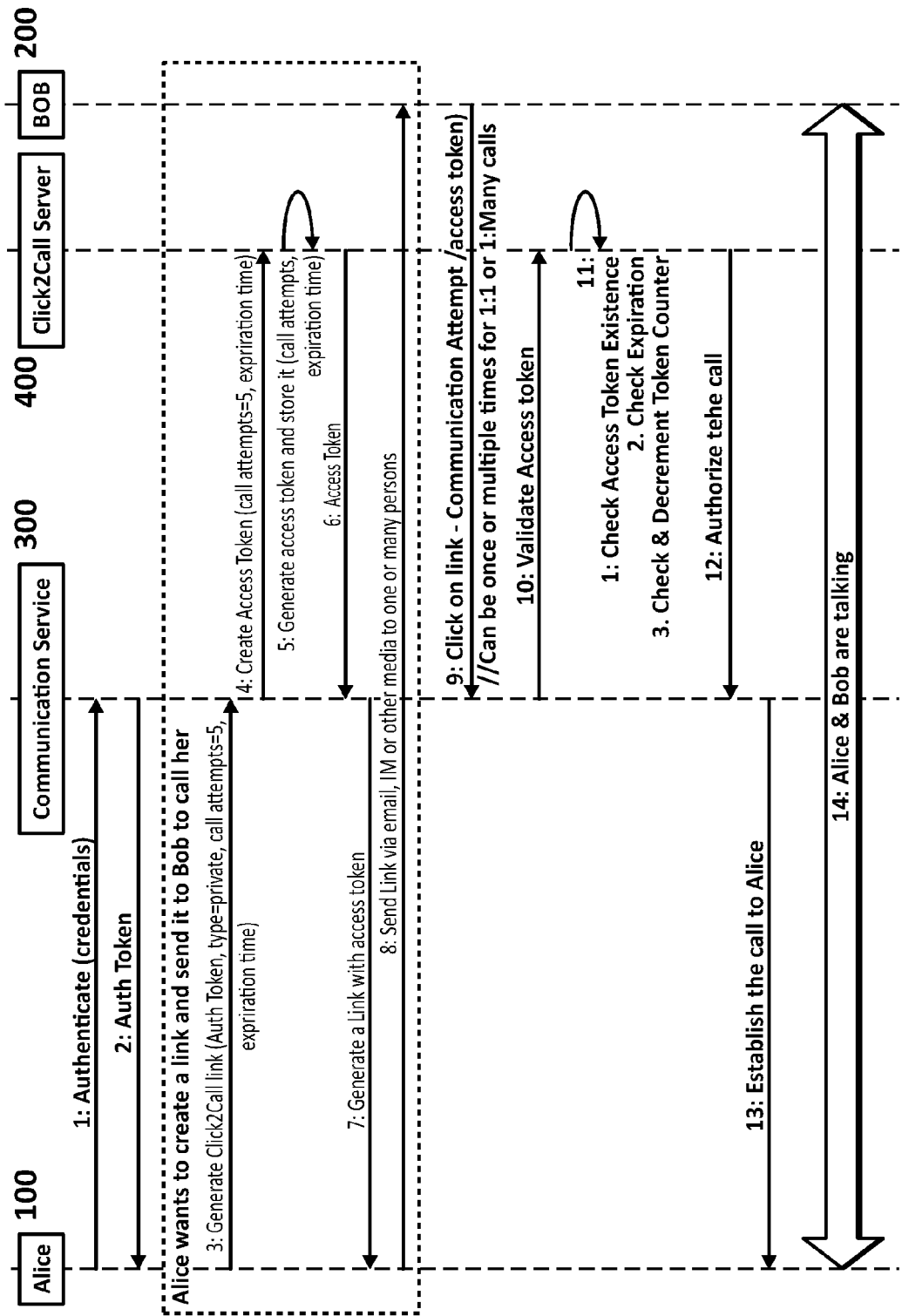
FIG. 1 illustrates a particular embodiment in which the hyperlink is indicated as being private.

In reference to FIG. 1, a first user 100 or Alice as is called in said FIG. 1 logs into a communication service 300, an application that provides communication capabilities such as messaging, audio and video call on the web, and authenticate with their credentials (1). Then the communication Service 300 authenticates said first user 100. If required, an authorization token may be sending in order to indicate said authentication.

Following, the first user 100 asks to the communication service 300 to generate a hyperlink or click2call me link as illustrated in the FIG. 1 which is associated to the communication address of said first user 100. In case the first user 100 has received said authorization token, this token may be also provided to the communication service 300 therefore increasing security. First user 100 according to this particular embodiment will indicate said hyperlink is a private hyperlink which can optionally limit the number of communication attempts, for instance to five in accordance to this embodiment, but it could limit to any other number of attempts, with expiration date (3). Number of communication attempts restricts both, the number of second users 200 or people to which later the first user 100 will send the hyperlink (8) and the number of communication attempts they can do with this hyperlink.

Following, the communication service access a first server 400 or Click2Call Server to create a token or access token with the parameters provided by the first user 100 (i.e. communication attempts and expiration time (4)). The first server 400 generates the token and keeps the token with the parameters (5). Then, the first server 400 sends the access token to the Communication Service 300 (6) said access token being further included in said hyperlink to be generated (7). Then, the first user 100 sends the hyperlink to a second user 200 referred as Bob in the figure (or to more people) preferably via an email, and instant message, or other communication channel (8).

Next, the second user 200 (or additional people) clicks the hyperlink to establish a communication attempt (9). The communication Service 300 requests the first server 400 to validate the access token (10). At that time, the first server 400 checks that said access token actually exists, that is that the access token has not expired and that the access token counter is above zero, then the first server 400 decrements the counter by 1 (11). The first server 400 based on said checking will authorize the communication (19), so the communication service 300 will establish a communication between the first user 100 and the second user 200 (13). Now both users can maintain an anonymous communication.

Figure 2:
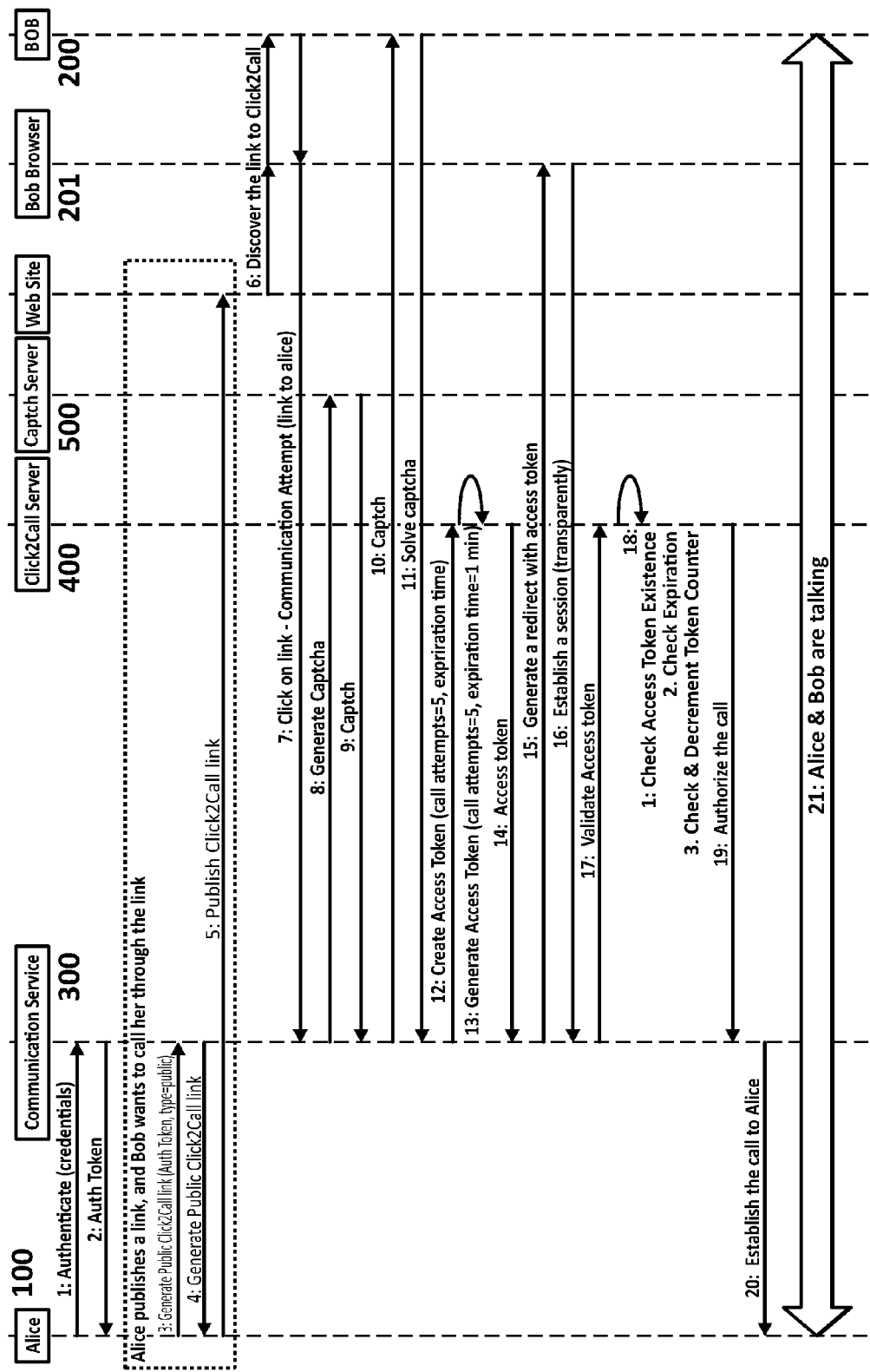
FIG. 2 illustrates a particular embodiment in which the hyperlink is indicated as being public.

In reference to FIG. 2, now the first user or Alice 100 indicates that said hyperlink is public. According to this embodiment, once the first user 100 has requested the generation of the hyperlink to the communication service 300 (3) and the latter having sent it back to the first user 100 (4), the first user 100 provides the received hyperlink by publishing it in a web page, a private or public web page where a click2call button or hyperlink can be published, such as blog, ecommerce site, web forums, etc. (5). Then, the second user or Bob 200 accesses said web page (6) for instance through its browser 201 and clicks on the received hyperlink. A communication attempt is made from the second user 200 to the communication service 300 (7). The communication service 300 requests to a second server 500, for instance a Captcha server, to generate a Captcha challenge (8-9) therefore allowing blocking communication spamming by an automated system. Then, the communication service sends the Captcha challenge to the second user via said second user's browser 201 (10). The second user 200 solves the Captcha challenge (11).

At that time, the communication service 300 uses the first server 400 to generate a second URL that includes the access token which encloses said usage restriction conditions (i.e. communication attempts and expiration time) (12, 13, 14). Following, the communication service redirects, by means of an HTTP redirection, said second user's browser 201 to said generated second URL which includes the access token, which then requests to the communication service 300, transparently to the second user 200, that is without providing identity of the second user 200, to negotiate a communication session (15-16).

Next, the communication service 300 requests the first server 400 to validate said access token by checking the usage restriction conditions of the hyperlink, for instance, if it has not expired, and then the first server 400 decrements the counter by 1 (18). Finally, the first server 400 based on said checking will authorize the communication (19), so the communication service 300 will establish a communication between the first user 100 and the second user 200.

It has to be noted that depending on which embodiment considering, FIG. 1 or FIG. 2, the token created by the first server 100 (or access token) is created in a different step depending on the generated hyperlink being private or public.

The present invention enables a first user 100 or any business to receive authorized toll free calls by creating a time and count limited hyperlink or URL and providing it, by a direct sending or by a publication on a web page, to a correspondent who can use said hyperlink to establish a communication, for instance an audio call without disclosing identification of the user such as the real phone number.

Moreover, the invention further limits the number of communications attempts and the period of time during which said anonymous communication can be done using said hyperlink.

The invention even allows a commercial web page to provide protected and authorized click2calls.

The scope of the present invention is defined in the following set of claims.

The invention claimed is:

1. A computer implemented method for an anonymous communication, wherein a communication is provided between a first user having a first computing device and at least a second user having a second computing device using at least a communication service accessible on a web, said method comprising:
   authenticating, by said communication service, in response to a request made by said first user to be logged into said communication service, user credential information of said first user to authorize said request;
   requesting, by said first user, to said communication service to generate a hyperlink that is associated to a communication address of said first user;
   providing, by said first user, said generated hyperlink to at least said second user;
   requesting, by at least said second user, to initiate said communication with said first user by directly clicking on said provided hyperlink, wherein an identity of at least said second user is maintained anonymous and an identity of said first user is done based on information provided on said hyperlink; and
   authorizing, by a first server in communication with said communication service, said communication between at least said second user and said first user,
   wherein the communication service uses said first server to generate a token, said token being further included in said hyperlink to be generated, and
   wherein previous to said authorizing, said token is further validated by the first server, said validation process comprising checking said hyperlink usage restriction conditions.

2. The computer implemented method according to claim 1, wherein said requesting to generate said hyperlink comprises indicating that said hyperlink to be generated is private and is to enclose usage restriction conditions, and said providing of said generated hyperlink is performed by directly sending said hyperlink, by the first user, to said second user.

3. The computer implemented method according to claim 1, wherein said providing of said hyperlink is performed via a communication channel at least including an email, a text message, a multimedia message or an instant message supported by said first computing device and said second user computing device.

4. The computer implemented method according to claim 1, wherein said requesting to generate said hyperlink comprises indicating that said hyperlink to be generated is public, and said providing of said generated hyperlink is performed by publishing said hyperlink in a web page, the method further comprising previous to said authorizing step being performed:
   requesting, by the communication service, generation of a human control and authorization mechanism to a second server;
   solving, by at least the second user, upon receiving a challenge for said human control and authorization mechanism from the communication service, said challenge; and
   using, by the communication service, said first server to generate a second URL including a token which encloses usage restriction conditions.

5. The computer implemented method according to claim 4, further comprising:
   redirecting, by the communication service, at least said second user, in response to said challenge solving, to said generated second URL including said token;
   negotiating, by the communication service and at least said second user, a session for the communication; and
   validating, by the first server, said token, said validation process comprising checking said usage restriction conditions.

6. The computer implemented method according to claim 4, wherein said human control and authorization mechanism comprises at least a Captcha mechanism.

7. The computer implemented method according to claim 1, wherein said usage restriction conditions at least limits a number of communication attempts in which said hyperlink is effective and/or a period of time in which said hyperlink remains valid.

8. The computer implemented method according to claim 1, wherein said communication at least comprises an audio call, a video call, a text message, a multimedia message, or an email.

9. A communication system including a processor coupled to a memory, comprising at least a communication service installed on a web configured to provide a communication between a first user having a first computing device and at least a second user having a second computing device, wherein:
   said communication service at least comprises:
      an authenticator configured to authenticate user credential information of said first user;
      a generator configured to generate a hyperlink associated to a communication address of said first user; and
      a communicator configured to communicate with a first server; and
   said first server at least comprises an authorizer configured to authorize said communication between at least said second user and said first user upon the first user having provided said generated hyperlink to said second user and said second user having requested initiation of said communication by directly clicking on said provided hyperlink,
   wherein the first server is configured to generate a token, said token being further included in said hyperlink to be generated, and
   wherein the authorizer further comprises a validator configured to validate a token by checking usage restriction conditions of said hyperlink.

10. The system according to claim 9, further comprising a second server configured to generate a human control and authorization mechanism.

11. The system according to claim 9, further comprising a communication channel or a web page of said web configured to perform the providing of the generated hyperlink to the second user.

12. A non-transitory computer readable medium storing a program causing a computer to execute a method for an anonymous communication, wherein a communication is provided between a first user having a first computing device and at least a second user having a second computing device using at least a communication service accessible on a web, the method comprising:

authenticating, by said communication service, in response to a request made by said first user to be logged into said communication service, user credential information of said first user to authorize said request;

requesting, by said first user, to said communication service to generate a hyperlink that is associated to a communication address of said first user;

providing, by said first user, said generated hyperlink to at least said second user;

requesting, by at least said second user, to initiate said communication with said first user by directly clicking on said provided hyperlink, wherein an identity of at least said second user is maintained anonymous and an identity of said first user is done based on information provided on said hyperlink; and authorizing, by a first server in communication with said communication service, said communication between at least said second user and said first user, wherein the communication service uses said first server to generate a token, said token being further included in said hyperlink to be generated, and wherein previous to said authorizing, said token is further validated by the first server, said validation process comprising checking said hyperlink usage restriction conditions.

* * * * *